United States Patent
Salzer

(10) Patent No.: US 6,835,029 B2
(45) Date of Patent: Dec. 28, 2004

(54) METHOD AND APPARATUS FOR BEVEL CUTTING PIPE

(75) Inventor: Gary L. Salzer, 24961 Schuck Rd., Washington, IL (US) 61571

(73) Assignee: Gary L. Salzer, Washington, IL (US)

( * ) Notice: Subject to any disclaimer, the term of this patent is extended or adjusted under 35 U.S.C. 154(b) by 249 days.

(21) Appl. No.: 10/217,781

(22) Filed: Aug. 13, 2002

(65) Prior Publication Data

US 2003/0205118 A1 Nov. 6, 2003

Related U.S. Application Data

(60) Provisional application No. 60/311,864, filed on Aug. 13, 2001.

(51) Int. Cl.[7] .............................................. B23B 35/00
(52) U.S. Cl. ....................... 408/1 R; 408/211; 408/227; 408/713; 82/113
(58) Field of Search ................................ 408/1 R, 199, 408/203.5, 211, 227, 231, 233, 713; 409/139, 140; 82/113; 7/157

(56) References Cited

U.S. PATENT DOCUMENTS

| | | | |
|---|---|---|---|
| 1,531,738 A | | 3/1925 | Davis |
| 1,662,936 A | * | 3/1928 | Robert .................. 82/173 |
| 1,750,394 A | | 3/1930 | Dumont |
| 2,204,516 A | | 6/1940 | Stone |
| 2,556,415 A | | 6/1951 | Buck |
| 3,118,476 A | | 1/1964 | Fiore |
| 3,137,208 A | * | 6/1964 | Andler .................. 408/211 |
| 3,672,017 A | | 6/1972 | Nielsen et al. |
| 3,754,832 A | * | 8/1973 | Stickler ................. 408/227 |
| 3,817,649 A | | 6/1974 | Medney |
| 3,872,748 A | | 3/1975 | Bjalme et al. |
| 4,205,493 A | | 6/1980 | Kim |
| 4,229,129 A | * | 10/1980 | Schaenzer ............. 408/228 |
| 4,743,146 A | | 5/1988 | Khemelnitsky et al. |
| 4,798,503 A | | 1/1989 | Huju |
| 4,955,165 A | | 9/1990 | Brooks et al. |
| 5,004,383 A | * | 4/1991 | Elliott, Jr. ............. 408/211 |
| 5,007,778 A | | 4/1991 | Hillestad et al. |
| 5,401,125 A | | 3/1995 | Sevack et al. |
| 5,810,522 A | * | 9/1998 | Parker .................. 408/103 |
| 5,853,272 A | | 12/1998 | Wartluft et al. |
| 5,961,382 A | | 10/1999 | Stoloski |
| 6,092,293 A | | 7/2000 | Donaldson |
| 6,146,067 A | | 11/2000 | Owens |

FOREIGN PATENT DOCUMENTS

| | | | | |
|---|---|---|---|---|
| CH | 35965 | * | 8/1906 | ................. 408/211 |
| DE | 721467 | * | 6/1942 | ................. 408/211 |

* cited by examiner

*Primary Examiner*—Daniel W. Howell
(74) *Attorney, Agent, or Firm*—Husch & Eppenberger, LLC; David A. Chambers; Robert C. Haldiman

(57) ABSTRACT

An apparatus for beveling an end of a pipe includes a base member operatively attached to a ring member by a plurality of ring support members and a plurality of blade support members. A removably attached blade has a top edge, a bottom edge and a longitudinal axis. The first edge and the second edge of the blade are helical along the longitudinal axis of the blade. The method includes engaging an end of the pipe with the rotating pipe bevel cutting apparatus and shaving material from the end of the pipe to form a bevel thereon having a preselected angle.

22 Claims, 2 Drawing Sheets

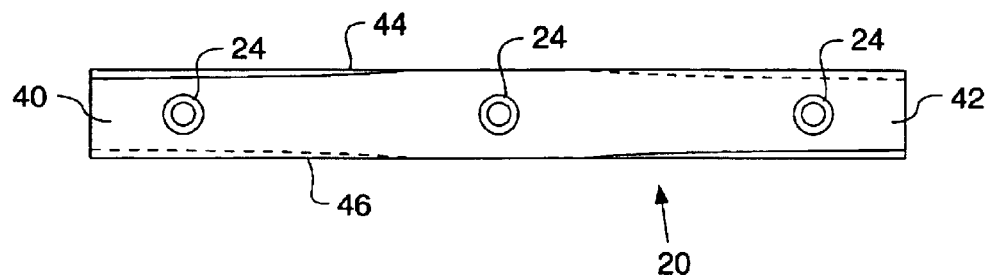
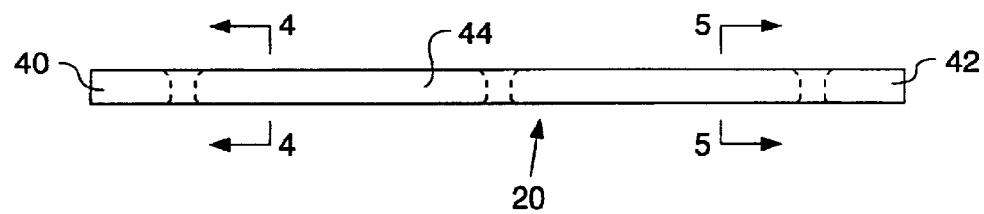
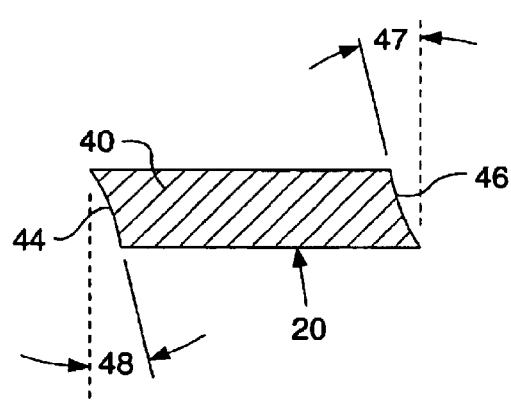
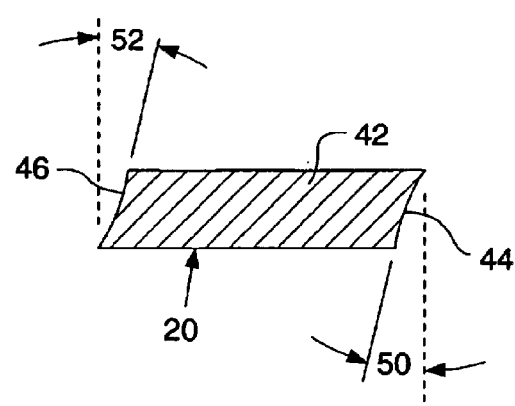

METHOD AND APPARATUS FOR BEVEL CUTTING PIPE

CROSS REFERENCE TO RELATED APPLICATIONS

This application claims priority from U.S. Provisional Patent Application No. 60/311,864 filed Aug. 13, 2001.

BACKGROUND OF THE INVENTION

Pipe bevel cutting or scarfing tools traditionally utilize a rotatable housing that encircles a pilot piece such as that disclosed in U.S. Pat. No. 3,817,649, which issued on Jun. 18, 1974. This is a very heavy and cumbersome structure. A separate bevel cutting tool is required for each specific outside diameter of pipe. This requires the chucking and removing of the bevel cutting tool from the power drill and then inserting and re-chucking a bevel cutting tool for each pipe having a different outside diameter. This is a very time consuming process. In addition, the cutting blades are secured to the inside of the enclosed housing. It is, therefore, very difficult to remove and exchange these cutting blades.

U.S. Pat. No. 4,955,165, which issued on Sep. 11, 1990, discloses a pipe tapering device having complex mechanism that includes cam means, cam followers, flange means and circumferentially spaced grinders. This is a complex and expensive device with associated high maintenance expenditures.

U.S. Pat. No. 5,961,382, which issued on Oct. 5, 1999, discloses a pipe beveler that includes a frustoconical collar having abrasive material on the inside surface. The abrasive material wears off quickly and there must be a separate size collar for each size of pipe having a different outside diameter.

U.S. Pat. No. 5,007,778, which issued on Apr. 16, 1991, discloses a portable power tool for milling tube ends. This mill cutter includes an enclosed structure that corresponds to the outside diameter of the pipe that requires bevel cutting.

U.S. Pat. No. 3,872,748, which issued on Mar. 25, 1975, discloses a hand crank bevel cutting tool that has an enclosure and an adjustable and retractable cutting tool. It would appear that either time consuming modification or a larger or smaller version of this device is required to bevel pipes of differing outside diameter.

The present invention is directed to overcoming one or more of the problems set forth above.

BRIEF SUMMARY OF THE INVENTION

In one aspect of the present invention, an apparatus for beveling an end of a pipe includes a base member operatively attached to a ring member by a plurality of support members, and at least one cutting blade removably attached to at least one support member.

In another aspect of the present invention, a method for bevel cutting pipe includes inserting an end of a pipe into a rotating pipe bevel cutting tool that includes a base member operatively attached to a ring member by at least one ring support member and at least one blade support member having a blade that is removedly attached to the at least one blade support member.

In yet another aspect of the present invention, a cutting blade is provided for bevel cutting pipe, the blade having top and bottom edges, wherein the top edge and the bottom edge of the blade are preferably helical along the longitudinal axis of the blade.

BRIEF DESCRIPTION OF THE DRAWINGS

Reference is now made to the accompanying drawings which illustrate the best known mode for carrying out the invention:

FIG. 2 is a side view of a blade for the pipe bevel cutting apparatus;

FIG. 3 is a top view of the blade shown in FIG. 2;

FIG. 4 is a cross-sectional view taken along line 4—4 in FIG. 3 and showing an angled top and bottom edge of the blade; and FIG. 5 is a cross-sectional view taken along line 5—5 in FIG. 3 and showing the angled top and bottom edge at a different location on the blade.

DETAILED DESCRIPTION OF THE INVENTION

Figure 1:
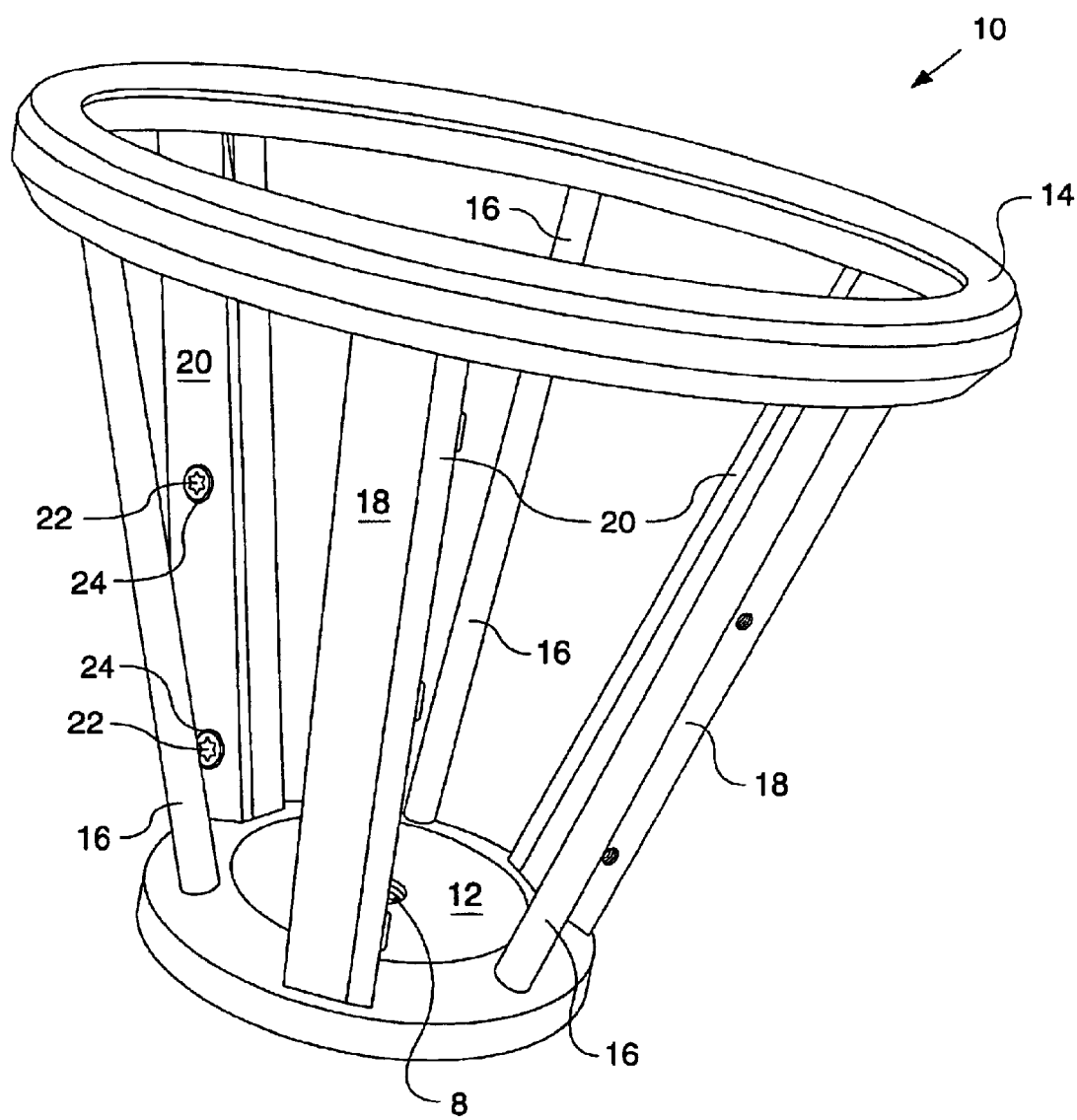
FIG. 1 is a perspective view of a pipe bevel cutting apparatus embodying the present invention.

The following detailed description provides numerous specific details for a thorough understanding of the invention; however, it will be understood by those skilled in the art that the invention may be practiced without these specific details. In other instances, well-known methods, procedures, and components have not been described in detail so as not to obscure the present description.

Referring now to the drawings, and initially to FIG. 1, a pipe bevel cutting apparatus of the present invention is generally indicated by numeral 10. There is a base member 12 that includes a threaded opening 8 for attachment to a power drill or other powered rotating machinery (not shown). There is a ring 14 that is attached to the base member 12 by at least one ring support member 16. The ring 14 is preferably circular, however, a wide variety of other geometric shapes may suffice. There are preferably three (3) circular, ring support members 16, however, the shape and number of these ring support members can vary tremendously. There is at least one blade support member 18 that is generally indicated by numeral 18. There are preferably three (3) rectangular, blade support members 18, however, the shape and number of these blade support members can also vary tremendously. This unique design allows various sized pipes to be bevel cut without the use of any guide system as mentioned in the prior art.

Secured to the side of each blade support member 18 is a blade 20. The blade 20 can be attached to the blade support member 18 by a wide variety of attachment mechanisms such as bolts, rivets, adhesives, and so forth, but the preferred mechanism utilizes at least one first threaded bolt 22. There are preferably three (3) first threaded bolts 22 utilized to attach the blade 20 to the blade support member 18. The preferred type of first threaded bolt 22 is a "hex-head" type bolt, however, any type of bolt head will suffice. The first threaded bolt 22, when fully secured to the blade support member 18, is preferably flush within a recess 24, as shown in FIG. 1.

The pipe bevel cutting apparatus 10 can be manufactured out of a wide variety of materials with the preferred material being nylon from both a cost and weight perspective. The preferred manufacturing technique is molding. However, a wide variety of metals such as aluminum, steel, iron and so forth, will suffice with greater strength typically present if manufactured as a unitary cast molding. If made of iron or steel in small quantities, then plug welding with associated chamfering of the ring support members 16 along with spot welding of the blade support members 18 is preferred. Furnace brazing is also a possibility.

This invention is primarily directed to cutting plastic piping such as that made out of polyvinyl chloride or other types of resins, however, any type of pipe, such as pipe made of steel, iron, fiberglass and so forth, may be beveled depending on the strength of the pipe bevel cutting apparatus 10. The outside diameters traditionally available for pipe include: 2 inches (5.08 centimeters), 2.5 inches (6.35 centimeters), 3 inches (7.62 centimeters) and 4 inches (10.16 centimeters). Thus, the embodiment shown can be used to cut plastic pipe within a range of 2 to 4 inches (5.08 to 10.16 centimeters). However, embodiments to cut pipe of greater or smaller outside pipe diameters are possible.

Referring to FIGS. 2 and 3, the blade 20, having a longitudinal axis, includes a first end portion 40 and a second end portion 42, a top edge 44 and a bottom edge 46. Both the top edge 44 and the bottom edge 46 of the blade 20 are preferably, but not necessarily, helical along the longitudinal axis of the blade 20 with a curved path that has both a constant rate of change of direction and a constant rate of change of plane.

Referring now to FIG. 4, there is a first curved angle 47 on the top edge 44 of the first end portion 40 of the blade 20. This first curved angle 47 is in a range from about a positive three (3°) degrees to about a negative three (3°) degrees and preferably in a range from about a positive two (2°) degrees to about a negative two (2°) degrees. There is a second curved angle 48 on the bottom edge 46 of the first end portion 40 of the blade 20. This second curved angle 48 is in a range from about a positive three (3°) degrees to about a negative three (3°) degrees and preferably in a range from about a positive two (2°) degrees to about a negative two (2°) degrees.

Referring now to FIG. 5, there is a third curved angle 50 on the top edge 44 of the second end portion 42 of the blade 20. This third curved angle 50 is in a range from about a positive three (3°) degrees to about a negative three (3°) degrees and preferably in a range from about a positive two (2°) degrees to about a negative two (2°) degrees. There is a fourth curved angle 52 on the bottom edge 46 of the second end portion 42 of the blade 20. This fourth curved angle 52 is in a range from about a positive three (3°) degrees to about a negative three (3°) degrees and preferably in a range from about a positive two (2°) degrees to about a negative two (2°) degrees.

This blade 20 can be reversed by removing the first threaded bolts 22 and flipping the blade 20 one hundred and eighty (180°) degrees and then inserting and re-tightening the first threaded bolts 22. This doubles the life of the blade 20 with easy access to the first threaded bolts 22 due to the open structure of the pipe bevel cutting apparatus 10.

It might be said that ring support members 16 are key in steadying the pipe being beveled and preventing the smaller sized pipes from becoming lodged between blade supports while engaging and disengaging the pipe with the rotating bevel tool. The ring support members 16 add strength to the tool yet leave it open allowing shavings to evacuate.

In operation, the power drill or other powered rotating machinery (not shown) is operatively connected to the pipe bevel cutting apparatus 10. The power drill or other powered rotating machinery (not shown) rotates the pipe bevel apparatus 10. An end of a pipe is inserted through the ring 14 until the end of said pipe engages the blade 20. If a plurality of blade support members 18 with accompanying blades 20 are utilized, the end of the pipe may contact more than one blade. Material is removed from the end of the pipe as the end engages the rotating blade or blades. When the desired amount of material is removed from the end of the pipe, the pipe is withdrawn from the pipe bevel cutting apparatus 10.

In summary, the method for removing material from an end of a pipe including the steps of: providing a pipe bevel cutting apparatus having a plurality of cutting blades extending outwardly at a preselected angle to a circular ring having a diameter greater than the pipe; rotating the pipe bevel cutting apparatus; inserting the end of the pipe through the ring and engaging the end of the pipe with the cutting blades; and shaving material from the end of the pipe to form a bevel thereon having said preselected angle.

Industrial Applicability

The present invention is advantageously applicable in providing a bevel or scarf to a pipe having a wide variety of outside diameters. It is very lightweight and does not require the use of a pilot piece. This pipe bevel cutting apparatus 10 can be used with a standard power drill and threadedly attached thereto by the threaded opening 8. The blades 20, which are preferably helical, provide superior cutting performance with both sides capable of being utilized.

Other aspects, objects and advantages of the present invention can be obtained from a study of the drawings, the disclosure and the accompanying claims. The invention in its broader aspects is not limited to the specific steps and apparatus shown and described but departures may be made therefrom within the scope of the accompanying claims without departing from the principles of the invention and without sacrificing its chief advantages.

What is claimed is:

1. A pipe cutting apparatus for beveling an end of a pipe comprising:
   (a) a base member having means for connecting to a powered rotating machine;
   (b) a ring for encircling the pipe and acting as a general guide;
   (c) a plurality of support members extending between the base member and the ring at a diverging angle;
   (d) a longitudinally-extending cutting blade removably attached to at least one of the support members for beveling the end of the pipe, the blade having a top and bottom edges and extending from adjacent the base member to adjacent ring; and
   (e) the base member, the ring, and the support members forming a generally conical frame structure for receiving the end of the pipe.

2. The pipe cutting apparatus of claim 1, wherein the top edge and the bottom edge of the cutting blade are helical with a curved path that has both a constant rate of change of direction and a constant rate of change of plane.

3. The pipe cutting apparatus of claim 2, wherein the means for connecting to a powered rotating machine includes a threaded hole.

4. The pipe cutting apparatus of claim 3, wherein the powered rotating machine includes a powered drill.

5. The pipe cutting apparatus of claim 3, wherein the plurality of support members includes three blade support members.

6. The pipe cutting apparatus of claim 3, wherein the plurality of support members includes three blade support members and three ring support members.

7. The pipe cutting apparatus of claim 6, wherein a blade is attached to each blade support member.

8. The pipe cutting apparatus of claim 7, wherein the three blade support members and the three ring support members are substantially the same length.

9. The pipe cutting apparatus of claim 7, wherein the base member is circular and the plurality of support members are equally spaced along the circumference of the base member.

10. The pipe cutting apparatus of claim 9, wherein the plurality of support members extend from the base member at a preselected angle.

11. The pipe cutting apparatus of claim 7, wherein the three blade support members are rectangular.

12. The pipe cutting apparatus of claim 9, wherein the three ring support members are circular.

13. A pipe bevel cutting apparatus for shaping an end of a pipe comprising:
(a) a base member to connect the pipe bevel cutting apparatus to a powered rotating machine;
(b) a ring that encircles the pipe and acts as a general guide;
(c) at least one ring support member that is operatively connected at one end to the base member and at the other end to the ring;
(d) at least one blade support member that is operatively connected at one end to the base member and at the other end to the ring; and
(e) at least one blade that is removedly attached to the at least one blade support member for removing material from the pipe, said at least one blade having a longitudinal axis, a top edge, and a bottom edge; such that the base member, the ring, the at least one ring support member, and the at least one blade support member form a conical structure for accepting the end of said pipe.

14. The pipe bevel cutting apparatus of claim 13, wherein the top edge and the bottom edge of the at least one blade are helical along the longitudinal axis of the blade with a curved path that has both a constant rate of change of direction and a constant rate of change of plane.

15. The pipe bevel cutting apparatus of claim 14, wherein the base member has a threaded hole for mounting the pipe bevel cutting apparatus to a power drill.

16. The pipe bevel cutting apparatus of claim 14, wherein the at least one ring support member and the at least one blade support member are substantially the same length.

17. The pipe bevel cutting apparatus of claim 14, wherein the at least one ring support member and the at least one blade support member extend from the base member at a preselected angle.

18. The pipe bevel cutting apparatus of claim 14, wherein the base member is circular and the at least one ring support member and the at least one blade support member are equally spaced along the circumference of the base member.

19. A method for removing material from an end of a pipe including the steps of:
(a) providing a pipe bevel cutting apparatus having a plurality of helical cutting blades extending outwardly at a preselected angle to a circular ring having a diameter greater than the pipe;
(b) rotating the pipe bevel cutting apparatus;
(c) inserting the end of the pipe through the ring and engaging the end of the pipe with the cutting blades; and
(d) shaving material from the end of the pipe to form a bevel thereon having said preselected angle.

20. The method for removing material from an end of a pipe of claim 19, wherein the plurality of cutting blades are reversible.

21. A pipe cutting apparatus for beveling an end of a pipe comprising:
(a) a base member;
(b) a ring offset from the base member;
(c) at least one support member extending between the base member and the ring at a diverging angle;
(d) at least one longitudinally-extending helical cutting blade removably attached to the at least one support member for beveling the end of the pipe; and
(e) the base member, the ring, and the at least one support member forming a generally conical frame structure for receiving the end of the pipe.

22. The pipe cutting apparatus according to claim 21, wherein the at least one longitudinally-extending helical cutting blade is reversible.

* * * * *